US009213694B2

(12) United States Patent
Hieber et al.

(10) Patent No.: US 9,213,694 B2
(45) Date of Patent: Dec. 15, 2015

(54) EFFICIENT ONLINE DOMAIN ADAPTATION

(71) Applicants: Felix Hieber, Heidelberg (DE); Jonathan May, Culver City, CA (US)

(72) Inventors: Felix Hieber, Heidelberg (DE); Jonathan May, Culver City, CA (US)

(73) Assignee: Language Weaver, Inc., Los Angeles, CA (US)

( * ) Notice: Subject to any disclaimer, the term of this patent is extended or adjusted under 35 U.S.C. 154(b) by 279 days.

(21) Appl. No.: 14/051,175

(22) Filed: Oct. 10, 2013

(65) Prior Publication Data

US 2015/0106076 A1    Apr. 16, 2015

(51) Int. Cl.
*G06F 17/28* (2006.01)

(52) U.S. Cl.
CPC ........ *G06F 17/2854* (2013.01); *G06F 17/2827* (2013.01)

(58) Field of Classification Search
CPC . G06F 17/28; G06F 17/2809; G06F 17/2828; G06F 17/2827; G06F 17/2854; G06F 17/2872; G06F 17/2881; G06F 17/289
USPC ....................................... 704/2, 4, 5, 7, 8, 10
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |

(Continued)

FOREIGN PATENT DOCUMENTS

| | | |
|---|---|---|
| CA | 2408819 | 11/2006 |
| CA | 2475857 | 12/2008 |

(Continued)

OTHER PUBLICATIONS

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. For Computational Linguistics, Morristown, NJ, 80-87. DOI=http://dx.doi.org/10.3115/1075096.1075107.

(Continued)

*Primary Examiner* — Qi Han
(74) *Attorney, Agent, or Firm* — Carr & Ferrell LLP

(57) ABSTRACT

Systems and methods for efficient online domain adaptation are provided herein. Methods may include receiving a post-edited machine translated sentence pair, updating a machine translation model by adjusting translation weights for a translation memory and a language model while generating test machine translations of the machine translated sentence pair until one of the test machine translations approximately matches the post-edits for the machine translated sentence pair, and retranslating the remaining machine translation sentence pairs that have yet to be post-edited using the updated machine translation model.

20 Claims, 4 Drawing Sheets

(56) References Cited

U.S. PATENT DOCUMENTS

| | | |
|---|---|---|
| 5,167,504 A | 12/1992 | Mann |
| 5,175,684 A | 12/1992 | Chong |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,488,725 A | 1/1996 | Turtle et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,587,902 A | 12/1996 | Kugimiya |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A | 12/1998 | Church et al. |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,960,384 A | 9/1999 | Brash |
| 5,963,205 A | 10/1999 | Sotomayor |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,185,524 B1 | 2/2001 | Carus et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,598,046 B1 | 7/2003 | Goldberg et al. |
| 6,604,101 B1 | 8/2003 | Chan et al. |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,910,003 B1 | 6/2005 | Arnold et al. |
| 6,952,665 B1 | 10/2005 | Shimomura et al. |
| 6,983,239 B1 | 1/2006 | Epstein |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |

(56) References Cited

U.S. PATENT DOCUMENTS

| | | |
|---|---|---|
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,200,550 B2 | 4/2007 | Menezes et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 7,974,976 B2 | 7/2011 | Yahia et al. |
| 7,983,897 B2 | 7/2011 | Chin et al. |
| 8,060,360 B2 | 11/2011 | He |
| 8,145,472 B2 | 3/2012 | Shore et al. |
| 8,214,196 B2 | 7/2012 | Yamada et al. |
| 8,219,382 B2 | 7/2012 | Kim et al. |
| 8,234,106 B2 | 7/2012 | Marcu et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,380,486 B2 | 2/2013 | Soricut et al. |
| 8,433,556 B2 | 4/2013 | Fraser et al. |
| 8,442,813 B1 | 5/2013 | Popat |
| 8,468,149 B1 | 6/2013 | Lung et al. |
| 8,504,351 B2 | 8/2013 | Waibel et al. |
| 8,543,563 B1 | 9/2013 | Nikoulina et al. |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 | 2/2014 | Fux et al. |
| 8,666,725 B2 | 3/2014 | Och |
| 8,676,563 B2 | 3/2014 | Soricut et al. |
| 8,694,303 B2 | 4/2014 | Hopkins et al. |
| 8,762,128 B1 | 6/2014 | Brants et al. |
| 8,825,466 B1 | 9/2014 | Wang et al. |
| 8,831,928 B2 | 9/2014 | Marcu et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,942,973 B2 | 1/2015 | Viswanathan |
| 8,943,080 B2 | 1/2015 | Marcu et al. |
| 8,977,536 B2 | 3/2015 | Och |
| 8,990,064 B2 | 3/2015 | Marcu et al. |
| 9,122,674 B1 | 9/2015 | Wong et al. |
| 9,152,622 B2 | 10/2015 | Marcu et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0004705 A1 | 1/2003 | Kempe |
| 2003/0009322 A1 | 1/2003 | Marcu |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |
| 2004/0044530 A1 | 3/2004 | Moore |

(56) References Cited

U.S. PATENT DOCUMENTS

| | | |
|---|---|---|
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0107999 A1 | 5/2005 | Kempe et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136824 A1 | 6/2006 | Lin |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0015121 A1 | 1/2007 | Johnson et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0073532 A1* | 3/2007 | Brockett ............... G06F 17/289 704/9 |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0052061 A1 | 2/2008 | Kim et al. |
| 2008/0065478 A1 | 3/2008 | Kohlmeier et al. |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0234634 A1 | 9/2009 | Chen et al. |
| 2009/0234635 A1 | 9/2009 | Bhatt et al. |
| 2009/0241115 A1 | 9/2009 | Raffo et al. |
| 2009/0248662 A1 | 10/2009 | Murdock |
| 2009/0313006 A1 | 12/2009 | Tang |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0184722 A1 | 7/2011 | Sneddon et al. |
| 2011/0191096 A1 | 8/2011 | Sarikaya et al. |
| 2011/0191410 A1 | 8/2011 | Refuah et al. |
| 2011/0225104 A1 | 9/2011 | Soricut et al. |
| 2012/0016657 A1 | 1/2012 | He et al. |
| 2012/0096019 A1 | 4/2012 | Manickam et al. |
| 2012/0116751 A1 | 5/2012 | Bernardini et al. |
| 2012/0136646 A1 | 5/2012 | Kraenzel et al. |
| 2012/0150441 A1 | 6/2012 | Ma et al. |
| 2012/0150529 A1 | 6/2012 | Kim et al. |
| 2012/0191457 A1 | 7/2012 | Minnis et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0124185 A1 | 5/2013 | Sarr et al. |
| 2013/0144594 A1 | 6/2013 | Bangalore et al. |
| 2013/0238310 A1 | 9/2013 | Viswanathan |
| 2013/0290339 A1 | 10/2013 | LuVogt et al. |
| 2014/0006003 A1 | 1/2014 | Soricut et al. |
| 2014/0019114 A1 | 1/2014 | Travieso et al. |
| 2014/0149102 A1 | 5/2014 | Marcu et al. |
| 2014/0188453 A1 | 7/2014 | Marcu et al. |
| 2014/0350931 A1* | 11/2014 | Levit ................ G06F 17/30976 704/243 |
| 2015/0106076 A1 | 4/2015 | Hieber et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |

(56) References Cited

FOREIGN PATENT DOCUMENTS

| | | |
|---|---|---|
| EP | 0715265 | 6/1996 |
| EP | 0933712 | 8/1999 |
| EP | 0933712 | 1/2001 |
| EP | 1488338 | 9/2004 |
| EP | 1488338 | 4/2010 |
| ES | 1488338 | 4/2010 |
| FR | 1488338 | 4/2010 |
| GB | 1488338 | 4/2010 |
| HK | 1072987 | 2/2006 |
| HK | 1072987 | 9/2010 |
| JP | 07244666 | 9/1995 |
| JP | 10011447 | 1/1998 |
| JP | 11272672 | 10/1998 |
| JP | 2004501429 | 1/2004 |
| JP | 2004062726 | 2/2004 |
| JP | 2008101837 | 5/2008 |
| JP | 5452868 | 1/2014 |
| WO | WO03083709 | 10/2003 |
| WO | WO03083710 | 10/2003 |
| WO | WO2004042615 | 5/2004 |
| WO | WO2007056563 | 5/2007 |
| WO | WO2011041675 | 4/2011 |
| WO | WO2011162947 | 12/2011 |

OTHER PUBLICATIONS

Grefenstette, Gregory, "The World Wide Web as a Resource for Example-Based Machine Translation Tasks", 1999, Translating and the Computer 21, Proc. of the 21 st International Conf. on Translating and the Computer. London, UK, 12 pp.

Grossi et al, "Suffix Trees and Their Applications in String Algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

Hatzivassiloglou, V. et al., "Unification-Based Glossing", 1995, Proc. of the International Joint Conference on Artificial Intelligence, pp. 1382-1389.

Huang et al., "Relabeling Syntax Trees to Improve Syntax-Based Machine Translation Quality," Jun. 4-9, 2006, in Proc. of the Human Language Technology Conference of the North American Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Bikel, D., Schwartz, R., and Weischedei, R., "An Algorithm that Learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Klein et al., "Accurate Unlexicalized Parsing," Jul. 2003, in Proc. of the 41st Annual Meeting of the ACL, pp. 423-430.

Knight et al., "Integrating Knowledge Bases and Statistics in MT," 1994, Proc. of the Conference of the Association for Machine Translation in the Americas.

Knight et al., "Filling Knowledge Gaps in a Broad-Coverage Machine Translation System", 1995, Proc. of the14th International Joint Conference on Artificial Intelligence, Montreal, Canada, vol. 2, pp. 1390-1396.

Knight, K. and Al-Onaizan, Y., "A Primer on Finite-State Software for Natural Language Processing", 1999 (available at http://www.isI.edu/licensed-sw/carmel).

Knight, K. and Al-Onaizan, Y., "Translation with Finite-State Devices," Proceedings of the 4th AMTA Conference, 1998.

Knight, K. and Chander, I., "Automated Postediting of Documents,"1994, Proc. of the 12th Conference on Artificial Intelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," 1995, Proc. of the 33rd Annual Conference of the ACL, pp. 252-260.

Knight, K. and Luk, S., "Building a Large-Scale Knowledge Base for Machine Translation," 1994, Proc. of the 12th Conference on Artificial Intelligence, pp. 773-778.

Knight, K. and Marcu, D., "Statistics-Based Summarization—Step One: Sentence Compression," 2000, American Association for Artificial Intelligence Conference, pp. 703-710.

Knight, K. and Yamada, K., "A Computational Approach to Deciphering Unknown Scripts," 1999, Proc. of the ACL Workshop on Unsupervised Learning in Natural Language Processing.

Knight, Kevin, "A Statistical MT Tutorial Workbook," 1999, JHU Summer Workshop (available at http://www.isI.edu/natural-language/mUwkbk.rtf).

Knight, Kevin, "Automating Knowledge Acquisition for Machine Translation," 1997, Al Magazine, vol. 18, No. 4.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, vol. 25, No. 4.

Knight, Kevin, "Integrating Knowledge Acquisition and Language Acquisition", May 1992, Journal of Applied Intelligence, vol. 1, No. 4.

Knight, Kevin, "Learning Word Meanings by Instruction,"1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. i-105, Dec. 2003.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondences in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information in Sentences," 1994, Proc. of COL-LING '94, vol. 2, pp. 1123-1127.

Langkilde, I. and Knight, K., "Generation that Exploits Corpus-Based Statistical Knowledge," 1998, Proc. of the COLING-ACL, pp. 704-710.

Langkilde, I. and Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

(56) References Cited

OTHER PUBLICATIONS

Langkilde-Geary, Irene, "An Empirical Verification of Coverage and Correctness for a General-Purpose Sentence Generator," 1998, Proc. 2nd Int'l Natural Language Generation Conference.
Lee, Yue-Shi, "Neural Network Approach to Adaptive Learning: with an Application to Chinese Homophone Disambiguation," IEEE 2001 pp. 1521-1526.
Lita, L., et al., "tRuEcasIng," 2003 Proceedings of the 41st Annual Meeting of the Assoc. For Computational Linguistics (In Hinrichs, E. and Roth, D.—editors), pp. 152-159.
Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations of Statistical Natural Language Processing," 2000, The MIT Press, Cambridge, MA [Front Matter].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Non-Final Office Action, Apr. 16, 2015, U.S. Appl. No. 11/454,212, filed Jun. 15, 2006.
Final Office Action, Nov. 19, 2013, U.S. Appl. No. 11/454,212, filed Jun. 15, 2006.
Non-Final Office Action, May 9, 2013, U.S. Appl. No. 11/454,212, filed Jun. 15, 2006.
Advisory Action, Nov. 29, 2011, U.S. Appl. No. 11/454,212, filed Jun. 15, 2006.
Final Office Action, Aug. 15, 2011, U.S. Appl. No. 11/454,212, filed Jun. 15, 2006.
Non-Final Office Action, Mar. 1, 2011, U.S. Appl. No. 11/454,212, filed Jun. 15, 2006.
Advisory Action, Sep. 30, 2010, U.S. Appl. No. 11/454,212, filed Jun. 15, 2006.
Final Office Action, Jul. 19, 2010, U.S. Appl. No. 11/454,212, filed Jun. 15, 2006.
Non-Final Office Action, Nov. 27, 2009, U.S. Appl. No. 11/454,212, filed Jun. 15, 2006.
Final Office Action, Sep. 24, 2009, U.S. Appl. No. 11/454,212, filed Jun. 15, 2006.
Non-Final Office Action, Mar. 3, 2009, U.S. Appl. No. 11/454,212, filed Jun. 15, 2006.
Final Office Action, Oct. 27, 2008, U.S. Appl. No. 11/454,212, filed Jun. 15, 2006.
Non-Final Office Action, Apr. 17, 2008, U.S. Appl. No. 11/454,212, filed Jun. 15, 2006.
Notice of Allowance, Jul. 9, 2009, U.S. Appl. No. 11/223,823, filed Sep. 9, 2005.
Non-Final Office Action, Feb. 3, 2009, U.S. Appl. No. 11/223,823, filed Sep. 9, 2005.
Non-Final Office Action, Aug. 6, 2008, U.S. Appl. No. 11/223,823, filed Sep. 9, 2005.
Advisory Action, Jun. 9, 2008, U.S. Appl. No. 11/223,823, filed Sep. 9, 2005.
Non-Final Office Action, Sep. 20, 2007, U.S. Appl. No. 11/223,823, filed Sep. 9, 2005.
Final Office Action, Mar. 4, 2008, U.S. Appl. No. 11/223,823, filed Sep. 9, 2005.
Notice of Allowance, Jun. 10, 2010, U.S. Appl. No. 11/197,744, filed Aug. 3, 2005.
Non-Final Office Action, Dec. 15, 2009, U.S. Appl. No. 11/197,744, filed Aug. 3, 2005.
Final Office Action, Aug. 25, 2009, U.S. Appl. No. 11/197,744, filed Aug. 3, 2005.
Non-Final Office Action, Feb. 10, 2009, U.S. Appl. No. 11/197,744, filed Aug. 3, 2005.
Non-Final Office Action, Jun. 18, 2008, U.S. Appl. No. 11/197,744, filed Aug. 3, 2005.
Advisory Action, Aug. 5, 2013, U.S. Appl. No. 11/272,460, filed Nov. 9, 2005.
Final Office Action, May 7, 2013, U.S. Appl. No. 11/272,460, filed Nov. 9, 2005.
Non-Final Office Action, Oct. 3, 2012, U.S. Appl. No. 11/272,460, filed Nov. 9, 2005.
Final Office Action, Jan. 27, 2010, U.S. Appl. No. 11/272,460, filed Nov. 9, 2005.
Examiner's Answer, Jul. 23, 2009, U.S. Appl. No. 11/272,460, filed Nov. 9, 2005.
Advisory Action, Jan. 22, 2009, U.S. Appl. No. 11/272,460, filed Nov. 9, 2005.
Final Office Action, Oct. 7, 2008, U.S. Appl. No. 11/272,460, filed Nov. 9, 2005.
Non-Final Office Action, Mar. 10, 2008, U.S. Appl. No. 11/272,460, filed Nov. 9, 2005.
Non-Final Office Action, Feb. 3, 2014, U.S. Appl. No. 11/272,460, filed Nov. 9, 2005.
Final Office Action, May 21, 2014, U.S. Appl. No. 11/272,460, filed Nov. 9, 2005.
Non-Final Office Action, Mar. 25, 2015, U.S. Appl. No. 11/272,460, filed Nov. 9, 2005.
Notice of Allowance, Mar. 20, 2009, U.S. Appl. No. 09/854,327, filed May 11, 2001.
Non-Final Office Action, Oct. 2, 2008, U.S. Appl. No. 09/854,327, filed May 11, 2001.
Final Office Action, Dec. 14, 2007, U.S. Appl. No. 09/854,327, filed May 11, 2001.
Non-Final Office Action, Jun. 6, 2007, U.S. Appl. No. 09/854,327, filed May 11, 2001.
Advisory Action, Jan. 10, 2007, U.S. Appl. No. 09/854,327, filed May 11, 2001.
Final Office Action, Sep. 18, 2006, U.S. Appl. No. 09/854,327, filed May 11, 2001.
Non-Final Office Action, Mar. 17, 2006, U.S. Appl. No. 09/854,327, filed May 11, 2001.
Non-Final Office Action, Sep. 15, 2005, U.S. Appl. No. 09/854,327, filed May 11, 2001.
Notice of Allowance, Jul. 30, 2007, U.S. Appl. No. 10/143,382, filed May 9, 2002.
Non-Final Office Action, Mar. 6, 2007, U.S. Appl. No. 10/143,382, filed May 9, 2002.
Non-Final Office Action, Aug. 8, 2006, U.S. Appl. No. 10/143,382, filed May 9, 2002.
Notice of Allowance, Nov. 16, 2009, U.S. Appl. No. 10/150,532, filed May 17, 2002.
Final Office Action, Jan. 12, 2009, U.S. Appl. No. 10/150,532, filed May 17, 2002.
Non-Final Office Action, Jul. 29, 2008, U.S. Appl. No. 10/150,532, filed May 17, 2002.
Non-Final Office Action, Jan. 9, 2008, U.S. Appl. No. 10/150,532, filed May 17, 2002.
Final Office Action, Jul. 19, 2007, U.S. Appl. No. 10/150,532, filed May 17, 2002.
Non-Final Office Action, Oct. 18, 2006, U.S. Appl. No. 10/150,532, filed May 17, 2002.
Non-Final Office Action, Apr. 17, 2006, U.S. Appl. No. 10/150,532, filed May 17, 2002.
Notice of Allowance, Apr. 28, 2006, U.S. Appl. No. 10/160,284, filed May 31, 2002.
Non-Final Office Action, Oct. 11, 2005, U.S. Appl. No. 10/160,284, filed May 31, 2002.
Notice of Allowance, Feb. 6, 2012, U.S. Appl. No. 10/190,298, filed Jul. 3, 2002.
Notice of Allowance, Oct. 25, 2011, U.S. Appl. No. 10/190,298, filed Jul. 3, 2002.

(56) References Cited

OTHER PUBLICATIONS

Final Office Action, Jan. 20, 2011, U.S. Appl. No. 10/190,298, filed Jul. 3, 2002.
Non-Final Office Action, Aug. 5, 2010, U.S. Appl. No. 10/190,298, filed Jul. 3, 2002.
Final Office Action, Aug. 18, 2009, U.S. Appl. No. 10/190,298, filed Jul. 3, 2002.
Non-Final Office Action, Feb. 26, 2009, U.S. Appl. No. 10/190,298, filed Jul. 3, 2002.
Non-Final Office Action, Aug. 4, 2008, U.S. Appl. No. 10/190,298, filed Jul. 3, 2002.
Advisory Action, Apr. 15, 2008, U.S. Appl. No. 10/190,298, filed Jul. 3, 2002.
Final Office Action, Dec. 7, 2007, U.S. Appl. No. 10/190,298, filed Jul. 3, 2002.
Non-Final Office Action, Jul. 19, 2007, U.S. Appl. No. 10/190,298, filed Jul. 3, 2002.
Advisory Action, Aug. 25, 2006, U.S. Appl. No. 10/190,298, filed Jul. 3, 2002.
Final Office Action, Jun. 8, 2006, U.S. Appl. No. 10/190,298, filed Jul. 3, 2002.
Non-Final Office Action, Feb. 14, 2006, U.S. Appl. No. 10/190,298, filed Jul. 3, 2002.
Non-Final Office Action, Sep. 29, 2005, U.S. Appl. No. 10/190,298, filed Jul. 3, 2002.
Notice of Allowance, Oct. 10, 2007, U.S. Appl. No. 10/401,134, filed Mar. 26, 2003.
Non-Final Office Action, Oct. 10, 2006, U.S. Appl. No. 10/401,134, filed Mar. 26, 2003.
Notice of Allowance, Jul. 10, 2009, U.S. Appl. No. 10/401,124, filed Mar. 26, 2003.
Final Office Action, Jun. 16, 2009, U.S. Appl. No. 10/401,124, filed Mar. 26, 2003.
Non-Final Office Action, Dec. 12, 2008, U.S. Appl. No. 10/401,124, filed Mar. 26, 2003.
Non-Final Office Action, May 13, 2008, U.S. Appl. No. 10/401,124, filed Mar. 26, 2003.
Non-Final Office Action, Oct. 12, 2007, U.S. Appl. No. 10/401,124, filed Mar. 26, 2003.
Advisory Action, Jul. 18, 2007, U.S. Appl. No. 10/401,124, filed Mar. 26, 2003.
Final Office Action, Apr. 3, 2007, U.S. Appl. No. 10/401,124, filed Mar. 26, 2003.
Non-Final Office Action, Oct. 11, 2006, U.S. Appl. No. 10/401,124, filed Mar. 26, 2003.
Notice of Allowance, Mar. 30, 2007, U.S. Appl. No. 10/387,032, filed Mar. 11, 2003.
Non-Final Office Action, Nov. 7, 2006, U.S. Appl. No. 10/387,032, filed Mar. 11, 2003.
Notice of Allowance, Jul. 9, 2009, U.S. Appl. No. 10/403,862, filed Mar. 28, 2003.
Non-Final Office Action, Nov. 13, 2008, U.S. Appl. No. 10/403,862, filed Mar. 28, 2003.
Advisory Action, Aug. 1, 2008, U.S. Appl. No. 10/403,862, filed Mar. 28, 2003.
Final Office Action, May 7, 2008, U.S. Appl. No. 10/403,862, filed Mar. 28, 2003.
Non-Final Office Action, Oct. 31, 2007, U.S. Appl. No. 10/403,862, filed Mar. 28, 2003.
Advisory Action, Jul. 30, 2007, U.S. Appl. No. 10/403,862, filed Mar. 28, 2003.
Final Office Action, May 9, 2007, U.S. Appl. No. 10/403,862, filed Mar. 28, 2003.
Non-Final Office Action, Nov. 8, 2006, U.S. Appl. No. 10/403,862, filed Mar. 28, 2003.
Notice of Allowance, Jul. 30, 2008, U.S. Appl. No. 10/402,350, filed Mar. 27, 2003.
Non-Final Office Action, Nov. 16, 2007, U.S. Appl. No. 10/402,350, filed Mar. 27, 2003.
Advisory Action, Aug. 15, 2007, U.S. Appl. No. 10/402,350, filed Mar. 27, 2003.
Final Office Action, May 30, 2007, U.S. Appl. No. 10/402,350, filed Mar. 27, 2003.
Non-Final Office Action, Nov. 8, 2006, U.S. Appl. No. 10/402,350, filed Mar. 27, 2003.
Notice of Allowance, May 15, 2013, U.S. Appl. No. 10/884,175, filed Jul. 2, 2004.
Advisory Action, Nov. 15, 2011, U.S. Appl. No. 10/884,175, filed Jul. 2, 2004.
Final Office Action, Aug. 29, 2011, U.S. Appl. No. 10/884,175, filed Jul. 2, 2004.
Non-Final Office Action, Feb. 4, 2011, U.S. Appl. No. 10/884,175, filed Jul. 2, 2004.
Advisory Action, May 3, 2010, U.S. Appl. No. 10/884,175, filed Jul. 2, 2004.
Final Office Action, Feb. 18, 2010, U.S. Appl. No. 10/884,175, filed Jul. 2, 2004.
Non-Final Office Action, Sep. 18, 2009, U.S. Appl. No. 10/884,175, filed Jul. 2, 2004.
Non-Final Office Action, Apr. 7, 2009, U.S. Appl. No. 10/884,175, filed Jul. 2, 2004.
Non-Final Office Action, Oct. 6, 2008, U.S. Appl. No. 10/884,175, filed Jul. 2, 2004.
Non-Final Office Action, Mar. 24, 2008, U.S. Appl. No. 10/884,175, filed Jul. 2, 2004.
Non-Final Office Action, Sep. 5, 2007, U.S. Appl. No. 10/884,175, filed Jul. 2, 2004.
Notice of Allowance, Dec. 31, 2009, U.S. Appl. No. 10/884,174, filed Jul. 2, 2004.
Non-Final Office Action, Aug. 11, 2009, U.S. Appl. No. 10/884,174, filed Jul. 2, 2004.
Final Office Action, Apr. 28, 2009, U.S. Appl. No. 10/884,174, filed Jul. 2, 2004.
Non-Final Office Action, Oct. 6, 2008, U.S. Appl. No. 10/884,174, filed Jul. 2, 2004.
Non-Final Office Action, Mar. 27, 2008, U.S. Appl. No. 10/884,174, filed Jul. 2, 2004.
Non-Final Office Action, Sep. 19, 2007, U.S. Appl. No. 10/884,174, filed Jul. 2, 2004.
Notice of Allowance, Jan. 13, 2010, U.S. Appl. No. 11/082,216, filed Mar. 15, 2005.
Notice of Allowance, Dec. 1, 2009, U.S. Appl. No. 11/082,216, filed Mar. 15, 2005.
Final Office Action, Oct. 9, 2009, U.S. Appl. No. 11/082,216, filed Mar. 15, 2005.
Non-Final Office Action, Mar. 31, 2009, U.S. Appl. No. 11/082,216, filed Mar. 15, 2005.
PTAB Decision, May 5, 2011, U.S. Appl. No. 11/087,376, filed Mar. 22, 2005.
Notice of Allowance, Jul. 23, 2012, U.S. Appl. No. 11/087,376, filed Mar. 22, 2005.
Notice of Allowance, Jun. 12, 2012, U.S. Appl. No. 11/087,376, filed Mar. 22, 2005.
Notice of Allowance, Jul. 13, 2011, U.S. Appl. No. 11/087,376, filed Mar. 22, 2005.
Examiner's Answer, Nov. 28, 2008, U.S. Appl. No. 11/087,376, filed Mar. 22, 2005.
Advisory Action, Feb. 22, 2008, U.S. Appl. No. 11/087,376, filed Mar. 22, 2005.
Final Office Action, Nov. 14, 2007, U.S. Appl. No. 11/087,376, filed Mar. 22, 2005.
Non-Final Office Action, May 24, 2007, U.S. Appl. No. 11/087,376, filed Mar. 22, 2005.
Notice of Allowance, Oct. 2, 2013, U.S. Appl. No. 11/107,304, filed Apr. 15, 2005.
Final Office Action, Apr. 9, 2012, U.S. Appl. No. 11/107,304, filed Apr. 15, 2005.
Non-Final Office Action, Aug. 30, 2011, U.S. Appl. No. 11/107,304, filed Apr. 15, 2005.
Final Office Action, Nov. 19, 2009, U.S. Appl. No. 11/107,304, filed Apr. 15, 2005.

(56) References Cited

OTHER PUBLICATIONS

Non-Final Office Action, May 13, 2009, U.S. Appl. No. 11/107,304, filed Apr. 15, 2005.
Advisory Action, Feb. 12, 2009, U.S. Appl. No. 11/107,304, filed Apr. 15, 2005.
Final Office Action, Dec. 4, 2008, U.S. Appl. No. 11/107,304, filed Apr. 15, 2005.
Non-Final Office Action, Jun. 9, 2008, U.S. Appl. No. 11/107,304, filed Apr. 15, 2005.
Non-Final Office Action, Dec. 21, 2007, U.S. Appl. No. 11/107,304, filed Apr. 15, 2005.
Notice of Allowance, Aug. 5, 2013, U.S. Appl. No. 11/250,151, filed Oct. 12, 2005.
Final Office Action, Aug. 29, 2012, U.S. Appl. No. 11/250,151, filed Oct. 12, 2005.
Non-Final Office Action, Dec. 2, 2011, U.S. Appl. No. 11/250,151, filed Oct. 12, 2005.
Final Office Action, Oct. 14, 2010, U.S. Appl. No. 11/250,151, filed Oct. 12, 2005.
Non-Final Office Action, May 13, 2010, U.S. Appl. No. 11/250,151, filed Oct. 12, 2005.
Final Office Action, Dec. 11, 2009, U.S. Appl. No. 11/250,151, filed Oct. 12, 2005.
Non-Final Office Action, May 13, 2009, U.S. Appl. No. 11/250,151, filed Oct. 12, 2005.
Non-Final Office Action, Oct. 28, 2008, U.S. Appl. No. 11/250,151, filed Oct. 12, 2005.
Notice of Allowance, Feb. 18, 2011, U.S. Appl. No. 11/158,897, filed Jun. 21, 2005.
Non-Final Office Action, Jun. 9, 2010, U.S. Appl. No. 11/158,897, filed Jun. 21, 2005.
Final Office Action, Sep. 10, 2009, U.S. Appl. No. 11/158,897, filed Jun. 21, 2005.
Non-Final Office Action, Mar. 17, 2009, U.S. Appl. No. 11/158,897, filed Jun. 21, 2005.
Notice of Allowance, Oct. 25, 2012, U.S. Appl. No. 11/592,450, filed Nov. 2, 2006.
Non-Final Office Action, Feb. 14, 2012, U.S. Appl. No. 11/592,450, filed Nov. 2, 2006.
Final Office Action, Feb. 28, 2011, U.S. Appl. No. 11/592,450, filed Nov. 2, 2006.
Non-Final Office Action, Sep. 28, 2010, U.S. Appl. No. 11/592,450, filled Nov. 2, 2006.
Non-Final Office Action, Apr. 1, 2010, U.S. Appl. No. 11/592,450, filed Nov. 2, 2006.
Notice of Allowance, Sep. 10, 2014, U.S. Appl. No. 11/635,248, filed Dec. 5, 2006.
Non-Final Office Action, Jul. 15, 2014, U.S. Appl. No. 11/635,248, filed Dec. 5, 2006.
Non-Final Office Action, Sep. 11, 2013, U.S. Appl. No. 11/635,248, filed Dec. 5, 2006.
Advisory Action, Nov. 1, 2011, U.S. Appl. No. 11/635,248, filed Dec. 5, 2006.
Final Office Action, Aug. 9, 2011, U.S. Appl. No. 11/635,248, filed Dec. 5, 2006.
Non-Final Office Action, Mar. 16, 2011, U.S. Appl. No. 11/635,248, filed Dec. 5, 2006.
Non-Final Office Action, Sep. 28, 2010, U.S. Appl. No. 11/635,248, filed Dec. 5, 2006.
Supplemental Notice of Allowability, Aug. 28, 2014, U.S. Appl. No. 11/501,189, filed Aug. 7, 2006.
Notice of Allowance, Jun. 26, 2014, U.S. Appl. No. 11/501,189, filed Aug. 7, 2006.
Advisory Action, Nov. 16, 2010, U.S. Appl. No. 11/501,189, filed Aug. 7, 2006.
Non-Final Office Action, Dec. 3, 2013, U.S. Appl. No. 11/501,189, filed Aug. 7, 2006.
Final Office Action, Sep. 2, 2010, U.S. Appl. No. 11/501,189, filed Aug. 7, 2006.
Non-Final Office Action, Apr. 13, 2010, U.S. Appl. No. 11/501,189, filed Aug. 7, 2006.
Notice of Allowance, Feb. 25, 2008, U.S. Appl. No. 11/412,307, filed Apr. 26, 2006.
Notice of Allowance, Feb. 19, 2008, U.S. Appl. No. 11/412,307, filed Apr. 26, 2006.
Non-Final Office Action, Aug. 7, 2007, U.S. Appl. No. 11/412,307, filed Apr. 26, 2006.
Final Office Action, Jul. 14, 2014, U.S. Appl. No. 11/640,157, filed Dec. 15, 2006.
Non-Final Office Action, Jan. 28, 2014, U.S. Appl. No. 11/640,157, filed Dec. 15, 2006.
Non-Final Office Action, Jul. 17, 2013, U.S. Appl. No. 11/640,157, filed Dec. 15, 2006.
Final Office Action, Dec. 4, 2012, U.S. Appl. No. 11/640,157, filed Dec. 15, 2006.
Non-Final Office Action, May 9, 2012, U.S. Appl. No. 11/640,157, filed Dec. 15, 2006.
Advisory Action, Nov. 17, 2011, U.S. Appl. No. 11/640,157, filed Dec. 15, 2006.
Final Office Action, Aug. 31, 2011, U.S. Appl. No. 11/640,157, filed Dec. 15, 2006.
Non-Final Office Action, Apr. 26, 2011, U.S. Appl. No. 11/640,157, filed Dec. 15, 2006.
Final Office Action, Sep. 1, 2010, U.S. Appl. No. 11/640,157, filed Dec. 15, 2006.
Non-Final Office Action, Jan. 21, 2010, U.S. Appl. No. 11/640,157, filed Dec. 15, 2006.
Non-Final Office Action, Jan. 29, 2015, U.S. Appl. No. 11/640,157, filed Dec. 15, 2006.
Notice of Allowance, Apr. 9, 2015, U.S. Appl. No. 11/640,157, filed Dec. 15, 2006.
Notice of Allowance, Feb. 11, 2013, U.S. Appl. No. 11/698,501, filed Jan. 26, 2007.
Non-Final Office Action, Jun. 7, 2012, U.S. Appl. No. 11/698,501, filed Jan. 26, 2007.
Final Office Action, Jul. 6, 2010, U.S. Appl. No. 11/698,501, filed Jan. 26, 2007.
Non-Final Office Action, Dec. 22, 2009, U.S. Appl. No. 11/698,501, filed Jan. 26, 2007.
Final Office Action, Aug. 4, 2009, U.S. Appl. No. 11/698,501, filed Jan. 26, 2007.
Non-Final Office Action, Dec. 24, 2008, U.S. Appl. No. 11/698,501, filed Jan. 26, 2007.
Non-Final Office Action, Jun. 4, 2013, U.S. Appl. No. 11/784,161, filed Apr. 4, 2007.
Final Office Action, Jul. 11, 2012, U.S. Appl. No. 11/784,161, filed Apr. 4, 2007.
Non-Final Office Action, Oct. 4, 2011, U.S. Appl. No. 11/784,161, filed Apr. 4, 2007.
Final Office Action, Oct. 13, 2010, U.S. Appl. No. 11/784,161, filed Apr. 4, 2007.
Non-Final Office Action, Apr. 26, 2010, U.S. Appl. No. 11/784,161, filed Apr. 4, 2007.
Final Office Action, Jan. 27, 2014, U.S. Appl. No. 11/784,161, filed Apr. 4, 2007.
Notice of Allowance, May 5, 2014, U.S. Appl. No. 11/784,161, filed Apr. 4, 2007.
Supplemental Notice of Allowance, Jul. 30, 2014, U.S. Appl. No. 11/784,161, filed Apr. 4, 2007.
Non-Final Office Action, Mar. 29, 2013, U.S. Appl. No. 12/077,005, filed Mar. 14, 2008.
Non-Final Office Action, Jul. 2, 2012, U.S. Appl. No. 12/077,005, filed Mar. 14, 2008.
Non-Final Office Action, Jun. 17, 2011, U.S. Appl. No. 12/077,005, filed Mar. 14, 2008.
Final Office Action, Dec. 14, 2011, U.S. Appl. No. 12/077,005, filed Mar. 14, 2008.
Notice of Allowance, Apr. 30, 2014, U.S. Appl. No. 11/811,228, filed Jun. 8, 2007.
Non-Final Office Action, Nov. 20, 2013, U.S. Appl. No. 11/811,228, filed Jun. 8, 2007.

(56) References Cited

OTHER PUBLICATIONS

Advisory Action, Sep. 27, 2013, U.S. Appl. No. 11/811,228, filed Jun. 8, 2007.
Final Office Action, Jul. 17, 2013, U.S. Appl. No. 11/811,228, filed Jun. 8, 2007.
Non-Final Office Action, Feb. 20, 2013, U.S. Appl. No. 11/811,228, filed Jun. 8, 2007.
Final Office Action, Feb. 1, 2011, U.S. Appl. No. 11/811,228, filed Jun. 8, 2007.
Non-Final Office Action, Jul. 7, 2010, U.S. Appl. No. 11/811,228, filed Jun. 8, 2007.
Notice of Allowance, Apr. 22, 2009, U.S. Appl. No. 11/811,384, filed Jul. 7, 2007.
Non-Final Office Action, Oct. 7, 2008, U.S. Appl. No. 11/811,384, filed Jul. 7, 2007.
Final Office Action, Mar. 27, 2012, U.S. Appl. No. 12/132,401, filed Jun. 3, 2008.
Non-Final Office Action, Aug. 23, 2011, U.S. Appl. No. 12/132,401, filed Jun. 3, 2008.
Notice of Allowance, Oct. 9, 2014, U.S. Appl. No. 12/132,401, filed Jun. 3, 2008.
Non-Final Office Action, Jun. 12, 2014, U.S. Appl. No. 12/218,859, filed Jul. 17, 2008.
Final Office Action, Apr. 24, 2012, U.S. Appl. No. 12/218,859, filed Jul. 17, 2008.
Non-Final Office Action, Aug. 5, 2011, U.S. Appl. No. 12/218,859, filed Jul. 17, 2008.
Final Office Action, Apr. 12, 2011, U.S. Appl. No. 12/218,859, filed Jul. 17, 2008.
Non-Final Office Action, Oct. 4, 2010, U.S. Appl. No. 12/218,859, filed Jul. 17, 2008.
Advisory Action, Jun. 20, 2013, U.S. Appl. No. 12/510,913, filed Jul. 28, 2009.
Final Office Action, Apr. 11, 2013, U.S. Appl. No. 12/510,913, filed Jul. 28, 2009.
Non-Final Office Action, Aug. 22, 2012, U.S. Appl. No. 12/510,913, filed Jul. 28, 2009.
Non-Final Office Action, Jun. 9, 2014, U.S. Appl. No. 12/510,913, filed Jul. 28, 2009.
Notice of Allowance, Oct. 7, 2014, U.S. Appl. No. 12/510,913, filed Jul. 28, 2009.
Supplemental Notice of Allowability, Jan. 26, 2015, U.S. Appl. No. 12/510,913, filed Jul. 28, 2009.
Supplemental Notice of Allowability, Feb. 2, 2015, U.S. Appl. No. 12/510,913, filed Jul. 28, 2009.
Notice of Allowance, Oct. 9, 2012, U.S. Appl. No. 12/572,021, filed Oct. 1, 2009.
Non-Final Office Action, Jun. 19, 2012, U.S. Appl. No. 12/572,021, filed Oct. 1, 2009.
Notice of Allowance, Mar. 13, 2012, U.S. Appl. No. 12/576,110, filed Oct. 8, 2009.
Non-Final Office Action, Jul. 7, 2011, U.S. Appl. No. 12/576,110, filed Oct. 8, 2009.
Non-Final Office Action, Sep. 24, 2013, U.S. Appl. No. 12/720,536, filed Mar. 9, 2010.
Non-Final Office Action, Jun. 27, 2012, U.S. Appl. No. 12/720,536, filed Mar. 9, 2010.
Advisory Action, Jun. 12, 2013, U.S. Appl. No. 12/720,536, filed Mar. 9, 2010.
Final Office Action, Apr. 24, 2013, U.S. Appl. No. 12/720,536, filed Mar. 9, 2010.
Final Office Action, Feb. 12, 2014, U.S. Appl. No. 12/720,536, filed Mar. 9, 2010.
Advisory Action, Apr. 23, 2014, U.S. Appl. No. 12/720,536, filed Mar. 9, 2010.
Non-Final Office Action, Jun. 23, 2014, U.S. Appl. No. 12/720,536, filed Mar. 9, 2010.
Non-Final Office Action, Mar. 25, 2015, U.S. Appl. No. 12/720,536, filed Mar. 9, 2010.
Non-Final Office Action, Sep. 23, 2013, U.S. Appl. No. 12/820,061, filed Jun. 21, 2010.
Final Office Action, Jun. 11, 2013, U.S. Appl. No. 12/820,061, filed Jun. 21, 2010.
Non-Final Office Action, Feb. 25, 2013, U.S. Appl. No. 12/820,061, filed Jun. 21, 2010.
Non-Final Office Action, Jun. 9, 2011, U.S. Appl. No. 12/722,470, filed Mar. 11, 2010.
Notice of Allowance, Aug. 18, 2014, U.S. Appl. No. 13/417,071, filed Mar. 9, 2012.
Office Action, Mar. 21, 2014, U.S. Appl. No. 13/417,071, filed Mar. 9, 2012.
Advisory Action, Jun. 26, 2013, U.S. Appl. No. 13/089,202, filed Apr. 18, 2011.
Final Office Action, Apr. 8, 2013, U.S. Appl. No. 13/089,202, filed Apr. 18, 2011.
Non-Final Office Action, Aug. 1, 2012, U.S. Appl. No. 13/089,202, filed Apr. 18, 2011.
Non-Final Office Action, Aug. 21, 2014, U.S. Appl. No. 13/089,202, filed Apr. 18, 2011.
Final Office Action, Jan. 21, 2015, U.S. Appl. No. 13/089,202, filed Apr. 18, 2011.
Advisory Action, Apr. 14, 2015, U.S. Appl. No. 13/089,202, filed Apr. 18, 2011.
Notice of Allowance, Nov. 14, 2013, U.S. Appl. No. 13/161,401, filed Jun. 15, 2011.
Notice of Allowance, Mar. 19, 2014, U.S. Appl. No. 13/277,149, filed Oct. 19, 2011.
Notice of Allowance, Jun. 13, 2014, U.S. Appl. No. 13/539,037, filed Jun. 29, 2012.
Non-Final Office Action, Mar. 19, 2015, U.S. Appl. No. 13/685,372, filed Nov. 26, 2012.
Non-Final Office Action, Jan. 8, 2015, U.S. Appl. No. 13/481,561, filed May 25, 2012.
Abney, Steven P., "Parsing by Chunks," 1991, Principle-Based Parsing: Computation and Psycholinguistics, vol. 44, pp. 257-279.
Agbago, A., et al., "Truecasing for the Portage System," In Recent Advances in Natural Language Processing (Borovets, Bulgaria), Sep. 21-23, 2005, pp. 21-24.
Al-Onaizan et al., "Statistical Machine Translation," 1999, JHU Summer Tech Workshop, Final Report, pp. 1-42.
Al-Onaizan et al., "Translating with Scarce Resources," 2000, 17th National Conference of the American Association for Artificial Intelligence, Austin, TX, pp. 672-678.
Al-Onaizan, Y. and Knight K., "Machine Transliteration of Names in Arabic Text," Proceedings of ACL Workshop on Computational Approaches to Semitic Languages. Philadelphia, 2002.
Al-Onaizan, Y. and Knight, K., "Named Entity Translation: Extended Abstract", 2002, Proceedings of HLT-02, San Diego, CA.
Al-Onaizan, Y. and Knight, K., "Translating Named Entities Using Monolingual and Bilingual Resources," 2002, Proc. of the 40th Annual Meeting of the ACL, pp. 400-408.
Alshawi et al., "Learning Dependency Translation Models as Collections of Finite-State Head Transducers," 2000, Computational Linguistics, vol. 26, pp. 45-60.
Alshawi, Hiyan, "Head Automata for Speech Translation", Proceedings of the ICSLP 96, 1996, Philadelphia, Pennsylvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.
Arbabi et al., "Algorithms for Arabic name transliteration," Mar. 1994, IBM Journal of Research and Development, vol. 38, Issue 2, pp. 183-194.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information Retrieval," SIGIR 97, Philadelphia, PA, © 1997, pp. 84-91.
Bangalore, S. and Rambow, O., "Evaluation Metrics for Generation," 2000, Proc. of the 1st International Natural Language Generation Conf., vol. 14, pp. 1-8.

(56) References Cited

OTHER PUBLICATIONS

Bangalore, S. and Rambow, O., "Using TAGs, a Tree Model, and a Language Model for Generation," May 2000, Workshop TAG+5, Paris.

Shapiro, Stuart (ed.), "Encyclopedia of Artificial Intelligence, 2nd edition", vol. D 2, 1992, John Wiley & Sons Inc; "Unification" article, K. Knight, pp. 1630-1637.

Shirai, S., "A Hybrid Rule and Example-based Method for Machine Translation," 1997, NTT Communication Science Laboratories, pp. 1-5.

Sobashima et al., "A Bidirectional Transfer-Driven Machine Translation System for Spoken Dialogues," 1994, Proc. of 15th Conference on Computational Linguistics, vol. 1, pp. 64-68.

Soricut et al., "Using a Large Monolingual Corpus to Improve Translation Accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workshop on Computational Approaches to Semitic Language.

Sumita et al., "A Discourse Structure Analyzer for Japanese Text," 1992, Proc. of the International Conference on Fifth Generation Computer Systems, vol. 2, pp. 1133-1140.

Sun et al., "Chinese Named Entity Identification Using Class-based Language Model," 2002, Proc. of 19th International Conference on Computational Linguistics, Taipei, Taiwan, vol. 1, pp. 1-7.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. For Computational Linguistics, Morristown, NJ.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Empirical Methods in Natural Language Processing and Very Large Corpora.

Tillman, C. and Xia, F., "A Phrase-Based Unigram Model for Statistical Machine Translation," 2003, Proc. of the North American Chapter of the ACL on Human Language Technology, vol. 2, pp. 106-108.

Tillmann et al., "A DP Based Search Using Monotone Alignments in Statistical Translation," 1997, Proc. of the Annual Meeting of the ACL, pp. 366-372.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural Language Processing (Shizen Gengo Shori), vol. 10, No. 3, Apr. 2003, pp. 87-114.

Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).

Ueffing et al., "Generation of Word Graphs in Statistical Machine Translation," 2002, Proc. of Empirical Methods in Natural Language Processing (EMNLP), pp. 156-163.

Varga et al., "Parallel Corpora for Medium Density Languages", In Proceedings of RANLP 2005, pp. 590-596.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Vogel, S. and Ney, H., "Construction of a Hierarchical Translation Memory," 2000, Proc. of Cooling 2000, Saarbrucken, Germany, pp. 1131-1135.

Wang, Y. and Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machine Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. and Knight, K. "A Syntax-Based Statistical Translation Model," 2001, Proc. of the 39th Annual Meeting of the ACL, pp. 523-530.

Yamada, K. and Knight, K., "A Decoder for Syntax-Based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of Coling-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report on Patentability and The Written Opinion, International application No. PCT/US2008/004296, Oct. 6, 2009, 5 pgs.

Document, Wikipedia.com, web.archive.org (Feb. 22, 2004) /http://en.wikipedia.org/wikii/Document>, Feb. 22, 2004.

Identifying, Dictionary.com, wayback.archive.org (Feb. 28, 2007) </http://dictionary.reference.com/browse/identifying>, accessed Oct. 27, 2011 <http://web.archive.org/web/20070228150533/http://dictionary.reference.com/browse/identifying>.

Koehn, P. et al, "Statistical Phrase-Based Translation," Proceedings of HLT-NAACL 2003 Main Papers, pp. 48-54 Edmonton, May-Jun. 2003.

Abney, S.P., "Stochastic Attribute Value Grammars", Association for Computational Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation," 2003,

(56) References Cited

OTHER PUBLICATIONS

Association for Computational Linguistics, vol. 29, No. 1, pp. 97-133 <URL: http://acl.ldc.upenn.edu/J/J03/J03-1005.pdf>.
Wang, W., et al. "Capitalizing Machine Translation" In HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Yasuda et al., "Automatic Machine Translation Selection Scheme to Output the Best Result," Proc. of LREC, 2002, pp. 525-528.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005), Annual Meeting of the ACL Assoc. for Computational Linguistics, Morristown, NJ, 597-604. DOI=http://dx.doi.org/10.3115/1219840.
Barnett et al., "Knowledge and Natural Language Processing," Aug. 1990, Communications of the ACM, vol. 33, Issue 8, pp. 50-71.
Baum, L., "An Inequality and Associated Maximization Technique in Statistical Estimation for Probabilistic Functions of Markov Processes", 1972, Inequalities 3:1-8.
Berhe, G. et al., "Modeling Service-based Multimedia Content Adaptation in Pervasive Computing," CF '04 (Ischia, Italy) Apr. 14-16, 2004, pp. 60-69.
Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.
Brants, T., "TnT—A Statistical Part-of-Speech Tagger," 2000, Proc. of the 6th Applied Natural Language Processing Conference, Seattle.
Brill, E., "Transformation-Based Error-Driven Learning and Natural Language Processing: A Case Study in Part of Speech Tagging", 1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL pp. 264-270.
Brown et al., "The Mathematics of Statistical Machine Translation: Parameter Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER Experiments with Inquery," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. For Computational Linguistics (Barcelona, Spain, Jul. 21-26, 2004). Annual Meeting of the ACL. Assoc. for Computational Linguistics, Morristown, NJ, 1.
Carl, M. "A Constructivist Approach to Machine Translation," 1998, New Methods of Language Processing and Computational Natural Language Learning, pp. 247-256.
Chen, et al., "Machine Translation: An Integrated Approach," 1995, Proc. of 6th Int'l Cont. on Theoretical and Methodological Issue in MT, pp. 287-294.
Cheng et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. For Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Yossi, Cohen "Interpreter for FUF," available at URL <ftp://ftp.cs.bgu.ac.il/pub/people/elhadad/fuf-life.lf> (downloaded Jun. 1, 2008).
Corston-Oliver, S., "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996,vol. 22, No. 4, pp. 481-496.
Dagan et al., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab et al., "A Statistical Word-Level Translation Model for Comparable Corpora," 2000, In Proc. of the Conference on Content Based Multimedia Information Access (RIAO).
Diab, M., "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad, Michael, "FUF: the Universal Unifier User Manual Version 5.2", 1993, Department of Computer Science, Ben Gurion University, Beer Sheva, Israel.
Elhadad, Michael, "Using Argumentation to Control Lexical Choice: A Functional Unification Implementation", 1992, Ph.D. Thesis, Graduate School of Arts and Sciences, Columbia University.
Elhadad, M. and Robin, J., "SURGE: a Comprehensive Plug-in Syntactic Realization Component for Text Generation", 1999 (available at http://www.cs.bgu.ac.il/-elhadad/pub.html).
Fleming, Michael et al., "Mixed-Initiative Translation of Web Pages," AMTA 2000, LNAI 1934, Springer-Verlag, Berlin, Germany, 2000, pp. 25-29.

(56) References Cited

OTHER PUBLICATIONS

Och, Franz Josef and Ney, Hermann, "Improved Statistical Alignment Models" ACLOO:Proc. of the 38th Annual Meeting of the Association for Computational Linguistics, Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>, retrieved on May 6, 2004, abstract.
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Fung, Pascale, "Compiling Bilingual Lexicon Entries From a Non-Parallel English-Chinese Corpus", 1995, Proc., of the Third Workshop on Very Large Corpora, Boston, MA, pp. 173-183.
Gale, W. and Church, K., "A Program for Aligning Sentences in Bilingual Corpora," 1991, 29th Annual Meeting of the ACL, pp. 177-183.
Gale, W. and Church, K., "A Program for Aligning Sentences in Bilingual Corpora," 1993, Computational Linguistics, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL 2004, July.
Germann et al., "Fast Decoding and Optimal Decoding for Machine Translation", 2001, Proc. of the 39th Annual Meeting of the ACL, Toulouse, France, pp. 228-235.
Germann, Ulrich: "Building a Statistical Machine Translation System from Scratch: How Much Bang for the Buck Can We Expect?" Proc. of the Data-Driven MT Workshop of ACL-01, Toulouse, France, 2001.
Isahara et al., "Analysis, Generation and Semantic Representation in Contrast—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Graciet C., Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, "Training Tree Transducers," In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 9, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed Mar. 1, 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Huang et al., "Statistical syntax-directed translation with extended domain of locality," Jun. 9, 2006, In Proceedings of AMTA, pp. 1-8.
Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.
Notice of Allowance mailed Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published In Proceedings of the 48th Annual Meeting of the Association for Computational Linguistics (ACL), Jul. 2010, pp. 612-621.
U.S. Appl. No. 11/454,212, filed Jun. 15, 2006.
Editorial FreeLancer Association, Guidelines for Fees, https://web.archive.org/web/20090604130631/http://www.the-efa.org/res/code_2.php, Jun. 4, 2009, retrieved Aug. 9, 2014.
Wasnak, L., "Beyond the Basics: How Much Should I Charge", https://web.archive.org/web/20070121231531/http://www.writersmarket.com/assets/pdf/How_Much_Should_I_Charge.pdf, Jan. 21, 2007, retrieved Aug. 19, 2014.

(56) References Cited

OTHER PUBLICATIONS

Summons to Attend Oral Proceedings mailed Sep. 18, 2014 in German Patent Application 10392450.7, filed Mar. 28, 2003.
Examination Report mailed Jul. 22,2013 in German Patent Application 112005002534.9, filed Oct. 12, 2005.
Office Action mailed Feb. 2, 2015 in German Patent Application 10392450.7, filed Mar. 28, 2003.
Abney, Steven P. , "Parsing by Chunks," 1994, Bell Communications Research, pp. 1-18.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A Full-Text Retrieval System with a Dynamic Abstract Generation Function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining Computational Complexity from Characteristic 'Phase Transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Niessen, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memorization with Applications to Context-Free Parsing", Computational Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. For Computational Linguistics—vol. 1 (Sapporo, Japan, Jul. 7-12, 2003). Annual Meeting of the ACL. Assoc. For Computational Linguistics, Morristown, NJ, 160-167. DOI= http://dx.doi.org/10.3115/1075096.
Och, F. and Ney, H., "Discriminative Training and Maximum Entropy Models for Statistical Machine Translation," 2002, Proc. of the 40th Annual Meeting of the Association for Computational Linguistics (ACL), Philadelphia, PA, pp. 295-302.
Och et al., ""Discriminative Training and Maximum Entropy Models for Statistical Machine Translation,"" In Proc. of the 40th Annual Meeting of the Association for Computational Linguistics (ACL), Philadelphia, PA, 2002.
Kumar, S. and Byrne, W., "Minimum Bayes-Risk Decoding for Statistical Machine Translation." HLTNAACL Conference. Mar. 2004, 8 pages.
Papineni et al., "Bleu: a Method for Automatic Evaluation of Machine Translation," 2001, IBM Research Report, RC22176(WQ102-022).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.,"Hybrid Language Processing in the Spoken Language Translator," IEEE 1997, pp. 107-110.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.

(56) References Cited

OTHER PUBLICATIONS

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [Front Matter].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

Russell, S. and Norvig, P., "Artificial Intelligence: A Modern Approach," 1995, Prentice-Hall, Inc., New Jersey [Front Matter].

Sang, E. and Buchholz, S., "Introduction to the CoNLL-2000 Shared Task: Chunking," 2002, Proc. of CoNLL-2000 and LLL-2000, Lisbon, Portugal, pp. 127-132.

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

Schutze, Hinrich, "Automatic Word Sense Discrimination," 1998, Computational Linguistics, Special Issue on Word Sense Disambiguation, vol. 24, Issue 1, pp. 97-123.

Selman et al., "A New Method for Solving Hard Satisfiability Problems," 1992, Proc. of the 10th National Conference on Artificial Intelligence, San Jose, CA, pp. 440-446.

Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.

* cited by examiner

Require: In-domain document $D$, generic domain model $\mathcal{M}$, weights $w$, Translation Memory TM, interpolation weight $\theta$
procedure EXPERIMENT($D, \mathcal{M}$)
   $\mathcal{M} \leftarrow$ ADAPT($\mathcal{M}$, TM)    ▷ Adapt general domain model to TM
   $\mathcal{H} \leftarrow \emptyset$    ▷ Set of hypothesis to be scored
   for $\hat{s}_i \in D$ do
     $\hat{t} \leftarrow$ TRANSLATE($\hat{s}, \mathcal{M}$); $\mathcal{H} \leftarrow \hat{t}$    ▷ Add hypothesis from the current model
     $\tilde{t} \leftarrow$ EDIT($\hat{s}, \hat{t}$)    ▷ Receive human post-edit
     $\mathcal{M} \leftarrow$ ADAPT($\mathcal{M}, \hat{s}, \tilde{t}$)    ▷ Adapt current model
     $w \leftarrow$ RETUNE($\mathcal{M}, w$, nbest($\hat{s}$), $\tilde{t}, \theta$)    ▷ Re-tune adapted model and interpolate new weights with $\theta$
   end for
   return BLEU($\mathcal{H}$)
end procedure

*FIG. 2*

For each $t_j, s_i \in V_s \times V_t$:

$$p(t_j|s_i) = \begin{cases} p(t_j|s_i) & \text{if } \hat{p}(\cdot|s_i) = 0 \\ \hat{p}(t_j|s_i) & \text{if } p(\cdot|s_i) = 0 \\ \alpha \hat{p}(t_j|s_i) + (1-\alpha)p(t_j|s_i) & \text{else} \end{cases}$$

where $$\alpha = \frac{\max(p(\cdot|s_i))}{\max(\hat{p}(\cdot|s_i)) + \max(p(\cdot|s_i))}$$

*FIG. 3*

EFFICIENT ONLINE DOMAIN ADAPTATION

CROSS REFERENCE TO RELATED APPLICATIONS

This Non-Provisional patent application is related to U.S. patent application Ser. No. 13/685,372, titled "Personalized Machine Translation via Online Adaptation", which was filed on Nov. 26, 2012, which is hereby incorporated by reference herein in its entirety including all references cited therein.

FIELD OF THE TECHNOLOGY

Embodiments of the disclosure relate to machine translation systems and methods. More specifically, but not by way of limitation, the present technology includes systems and methods that provide efficient online domain adaptation where updates to a machine translation system occur as soon as post-edits to machine translations are received by the machine translation system.

BACKGROUND OF THE DISCLOSURE

Post edit data, such as human translator feedback, may be created by human translators in order to correct a machine translation sentence pair. For example, a machine translation sentence pair may include a source sentence unit, such as a word or phrase, as well as a machine translation generated target sentence unit. If the target sentence unit generated by the machine translation system is incorrect, a human translator may generate post-edits that correct the error. While these post-edits are a valuable resource for customizing and adapting statistical machine translation models, updating the machine translation system with these post-edits remains a difficult endeavor.

SUMMARY OF THE DISCLOSURE

According to some embodiments, the present technology may be directed to a method of immediately updating a machine translation system with post-edits during translation of a document, using a machine translation system that comprises a processor and a memory for storing logic that is executed by the processor to perform the method, comprising: (a) receiving a post-edited machine translated sentence pair, wherein the post-edited machine translated sentence pair comprises a source sentence unit and a post-edited target sentence unit; (b) updating a machine translation model by: (i) performing an alignment of the post-edits of the machine translated sentence pair to generate phrases; and (ii) adding the phrases to the machine translation model; (c) adapting a language model from the target sentence unit of the post-edits; (d) calculating translation statistics for the post-edits; (e) adjusting translation weights using the translation statistics while generating test machine translations of the machine translated sentence pair until one of the test machine translations approximately matches the post-edits for the machine translated sentence pair; and (f) retranslating the remaining machine translation sentence pairs that have yet to be post-edited using the updated machine translation model and the adjusted translation weights.

According to other embodiments, the present technology may be directed to a machine translation system that immediately incorporates post-edits into a machine translation model during translation of a document, the machine translation system comprising: (1) a processor; and (2) a memory for storing logic that is executed by the processor to: (a) receiving a post-edited machine translated sentence pair, wherein the post-edited machine translated sentence pair comprises a source sentence unit and a post-edited target sentence unit; (b) updating a machine translation model by: (i) performing an alignment of the post-edits of the machine translated sentence pair to generate phrases; and (ii) adding the phrases to the machine translation model; (c) adapting a language model from the target sentence unit of the post-edits; (d) calculating translation statistics for the post-edits; (e) adjusting translation weights using the translation statistics while generating test machine translations of the machine translated sentence pair until one of the test machine translations approximately matches the post-edits for the machine translated sentence pair; and (f) retranslating the remaining machine translation sentence pairs that have yet to be post-edited using the updated machine translation model.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 is an example of an algorithm utilized by a machine translation system to immediately update a machine translation system with post-edits during translation of a document;

FIG. 3 is an example of an algorithm utilized by a machine translation system to update a probability table used by the machine translation system.

DETAILED DESCRIPTION

Figure 1:
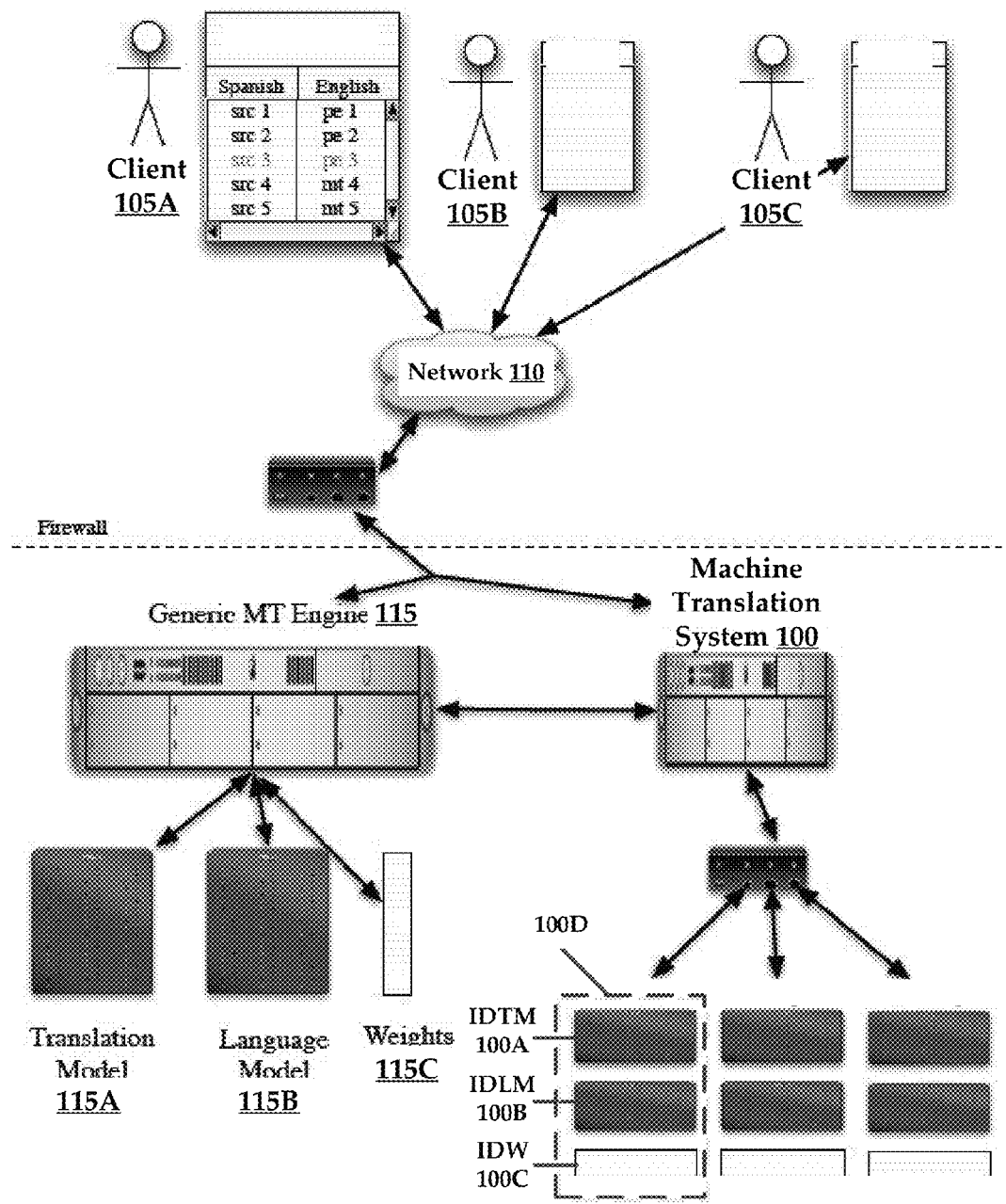
FIG. 1 is an exemplary computing architecture that may be used to practice aspects of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The present technology provides for fast online updates to a machine translation system that uses language pairs, immediately after the machine translation system receives a new sentence pair. For example, the machine translation system may receive a new sentence pair that includes a source sentence unit and a post-edited target sentence unit. The post-edited target sentence unit includes changes to an original target sentence unit that was provided to a translator.

For context, the phrase "sentence unit" may be understood to include any sub-sentential unit that is obtained from a sentence in a document that is to be translated. In general, a machine translation system receives a document for translation and uses machine translation techniques to translate the document in a source language into a target language. This machine translation process includes breaking the source document into sentences and further dividing the sentences into sub-sentential units. Using methods that would be known to one of ordinary skill in the art, the machine translation system outputs sentence pairs for the sentence that include source sentence units and target sentence units that are machine translations of the source sentence units.

These sentence pairs are evaluated by human translators who may edit or change the target sentence unit of a sentence pair to correct errors in the machine translation. These changes are referred to as post-edits of target sentence units.

New information obtained from the post-edited target sentence unit is incorporated into the statistical models of the language pairs and may be passed to the decoder. With a fast online tuning method, the translation model of the present technology may utilize this new information in subsequent translations. This method yields significant bilingual evaluation understudy (BLEU) improvements over both small-scale and strong baselines when translating coherent in-domain sentences.

As opposed to adding new data to a static translation memory, the present technology may employ a translation model update procedure to modify relevant parts of probabilistic models of the translation model in order to update machine translations of subsequent sentences of a document.

FIG. 1 illustrates an exemplary architecture, which implements a methodology for rapidly adapting a machine translation system such that it can better anticipate the behavior of a human post-editor who is tasked with converting automatic translations of a source language text into high-quality translations in a desired target language. The architecture may include a plurality of clients 105A-C that are coupled with both a generic machine translation (MT) engine 115 and a machine translation system 100. Generally, the generic MT engine 115 initially generates machine translation pairs for a document received from one of the clients. The generic MT engine 115 utilizes a translation model (TM) 115A, a language model (LM) 115B and generic weights 115C that affect how the generic MT engine 115 translates the document received from the client, by affecting application of the translation model 115A and the language model 115B.

The machine translation system 100 is configured to utilize post-edits received from the clients to generate in-domain adapted and retuned machine translation models. For example, the machine translation system 100 generates both an in-domain translation model (IDTM) 100A, an in-domain language model (IDLM) 100B, and in-domain weighting (IDW) 100C. In some embodiments, each client may have their own IDTM, IDLM, and IDW due to the machine translation system's ability to re-translate remaining sentence pairs for a translator as post-edits from the translator are received by the machine translation system 100.

Thus, in some embodiments, the IDTM, IDLM, and IDW are invoked and utilized by the machine translation system 100 during a single translation session for a translator. In other embodiments, the IDTM, IDLM, and IDW may persist and can be utilized for multiple translation projects.

The following description provides an example of the use of the machine translation system 100 by a client, such as client 105A. Initially the post-editor associated with client 105A receives a source language text and automatic translations in the target language generated by a baseline machine translation engine 115. The source language text and automatic translations are also referred to as a sentence pair. The sentence pair includes a source sentence unit and a target sentence unit that is a machine translation of the source sentence unit.

Changes to the target sentence unit by the client 105A are referred to as a post-edited target sentence unit. As the post-editor corrects a target sentence unit, the post-edits are transmitted to the machine translation system 100. The machine translation system 100 then automatically learns new sub-sentential translation correspondences and enhances the generic MT engine 115 with these correspondences. The machine translation system 100 also adjusts the parameters of the generic MT engine 115 to optimize translation performance on the corrected translations. The result is a generic MT engine 115 that is better equipped to handle the vocabulary and phrasing choices desired by the post-editor on his/her current workflow.

FIG. 1 illustrates a server-side instantiation of the machine translation system 100 that continuously updates translations and personalizes on a per-user, per-document basis. It will be understood that many other variants of this approach are possible using the same technology. For instance, the updating may be done client side, the updating may be periodic instead of continuous, and the scope of personalization may be wider or narrower than per-user, per-document.

The translation model 115A and language model 115B are typically very large databases, where the weights are a vector of numbers. The machine translation system 100 has the ability to instantiate and reset the per-user, and in-domain translation models IDTM 100A, in-domain language models IDLM 100B, and in-domain weighting IDW 100C. It will be understood that IDTM 100A, IDLM 100B, and IDW 100C may belong to client 105A and are illustrated as a set of personalized machine translation tools 100D. Indeed, each client is provided with their own IDTM, IDLM, and IDW. Upon instantiation and reset the IDTM 100A and IDLM 100B are empty databases and the IDW 100C is equal to the generic weights 115C used by the generic MT engine 115. The IDTM 100A and IDLM 100B are typically very small databases compared to the generic TM 115A and LM 115B.

In some embodiments, the clients 105A-C communicate with the machine translation system 100 via a REST API over a network 110 such as the Internet. The API responds to requests for translation keyed to a user, requests to update the IDTM 100A, the IDLM 100B, and the IDW 100C, and requests to reset a per-user IDTM 100A, the IDLM 100B, and the IDW 100C.

When a client 105A begins to post-edit a document, the client 105A requests that the machine translation system 100 instantiate or reset the per-user IDTM 100A, IDLM 100B, and IDW 100C, and requests translations for the document segments, which are carried out initially by the generic MT engine 115. The generic MT engine 115 responds to the client request with a set of machine translated sentence pairs.

When a user post-edits a translation, and specifically a target sentence unit, the client 105A requests that the machine translation system 100 update the IDTM 100A, IDLM 100B, and IDW 100C for the user with new translational correspondences, target language phrases, and parameter weights to remember the post-edit corrections made by the user. The client 105A then requests re-translation of the remaining sentence pairs by the generic MT engine 115. The generic MT engine 115 may then re-translate the documents consulting the user's IDTM 100A, IDLM 100B, and IDW 100C via calls to the machine translation system 100, and also using generic models where appropriate. In some embodiments, once translation of a document is completed and a new document translation process begins, the client 105A may request a reset of their IDTM 100A, IDLM 100B, and IDW 100C.

In some embodiments, the machine translation system may execute test machine translations of the original sentence pairs and adjust the IDW 100C until the test machine translations generated by the generic MT engine 115 approximately match the post edit sentence pair received from the client 105A, as determined by BLEU. That is, once the machine translation system 100 populates the translation model with words and phrases from forced alignment of the post-edit sentence pair and creates the IDLM 100B, the machine translation system 100 may iteratively adjust the components of the IDW 100C until the translations generated by the generic MT engine 115 approximate the translation quality of the human translator.

While the above embodiments contemplate a separate generic MT engine 115 and machine translation system 100, it will be understood that the functionalities of these systems may be combined into a single machine translation system. Further, the functionalities of these systems may be executed on the client device 105A, rather than the client 105A interacting with the generic MT engine 115 and the machine translation system 100 over a network 110.

The following description provides details regarding the processes used by the machine translation system 100 to create and utilize the IDTM 100A, IDLM 100B, and IDW 100C for a client. The machine translation system 100 provides both a machine translation model adaptation process and a retuning of parameter weights. FIG. 2 illustrates an exemplary algorithm that includes both the machine translation model adaptation and weight retuning processes. Generally, new information obtained from the post-edits of machine translated sentence pairs are added to the model by updating vocabularies, databases, and phrase tables. Next, the algorithm adjusts existing translation model weights to encourage usage of new in-domain phrases using an online discriminative ridge regression technique.

The following variables are defined for purposes of clarity: Vs is a vocabulary of source words; Vt is a vocabulary of target words encountered by the machine translation system; $(\hat{s},\hat{t})$ a post-edited machine translated sentence pair that is used to adapt a translation model M (e.g., IDTM 100A); and $(s^-, t^-)$ is a phrase pair generated from the post-edited machine translated sentence pair.

The following steps are performed in sequence with parallelism where possible. First, $(\hat{s},\hat{t})$ is tokenized and modified into lowercase. Next, Vt and Vs are updated with unknown words from $(\hat{s},\hat{t})$. Subsequently, the machine translation system 100 uses use existing, static alignment models, which are pre-trained on original training data in both directions, to "force align" $(\hat{s},\hat{t})$ and run regular alignment refinement heuristics to produce a word alignment for $(\hat{s},\hat{t})$.

Next, the machine translation system 100 builds a small in-domain language model (IDLM 100B) during adaptation of the machine translation model. For each $(\hat{s},\hat{t})$, the machine translation system performs an ngram-count to update an existing count file, also the machine translation system 100 recompiles the in-domain language model (IDLM 100B) using a smoothing algorithm, such as Witten-Bell smoothing. Since the amount of in-domain data is fairly small, the machine translation system 100 re-builds the IDLM 100B quickly and efficiently.

Next, the machine translation system 100 updates a fractional count table by extracting fractional counts from $(\hat{s},\hat{t})$ and adds these new counts to the fractional count table. In some embodiments the machine translation system 100 extracts and filters lexicon entries from $(\hat{s},\hat{t})$ and its alignments. An exemplary algorithm for building the fractional count table includes, but is not limited to, the IBM Model 4 Table, $M4=\{cf(tj|si)\}|Vs|\times|Vt|$.

After updating the fraction count table, the machine translation system 100 then updates a probability distribution table to change the distributions for each source term $s_i \epsilon (\hat{s},\hat{t})$. In some embodiments, this includes the determination of maximum likelihood word alignments from $(\hat{s},\hat{t})$ and its alignments.

To avoid dumping M1 databases to disk in text format or storing counts and re-normalizing, the machine translation system 100 may perform a heuristic update. Assuming that Vs and Vt were already updated, the machine translation system 100 uses the following equation $M1_{\hat{s},\hat{t}}=\{\hat{p}(tj|si)\}Vs \times Vt$ to determine Viterbi alignments extracted from $(\hat{s},\hat{t})$. In some embodiments, the machine translation system 100 may utilize IBM Model 1 Tables algorithm ($M1=\{p(tj|si)\}|Vs|\times|Vt|$)

Also, FIG. 3 illustrates an example of a heuristic algorithm that may be utilized to alter the probability distributions for the translation model.

Next, the machine translation system 100 may be configured to adapt a phrase table used to generate phrases from sentence pairs. To obtain a set of new phrases $P=\{(e^-,f^-)\}_1$, the machine translation system 100 executes a phrase extraction pipeline, which includes forward/inverse phrase extraction and sorting.

The process of adapting the phrase table used by the machine translation system 100 may include the pre-computing of various phrase features for the phrases ($e^-$, $f^-$) that were extracted from the post-edited machine translation sentence unit. Various features that are computed by the machine translation system include "missing word," for which the machine translation system 100 uses the previously updated IBM Model 4 table as described above. Also, the machine translation system 100 may use an "inverse IBM Model 1" feature which employs the previously (heuristically) updated IBM Model 1 tables. Another exemplary feature includes "inverse phrase probability", which is computed using counts of inversely extracted phrases.

The machine translation system 100 is also configured to execute a process of retuning of model weights. The machine translation system 100 is configured to adjust model weights to encourage the inclusion of new phrases and adaptation to the target domain. In some instances, the machine translation system 100 may adjust translation model weights using a tuning method such as discriminative ridge regression (DRR), although other translation model tuning methods known to one of ordinary skill in the art may also likewise be utilized.

The discriminative ridge regression method includes the determination of an nbest($\hat{s}$) list for the re-decode of a source sentence $\hat{s}$, ordered by decreasing derivation scores. The machine translation system 100 builds an n×m matrix $R_{\hat{s}}$ that contains the difference vectors between each feature vector $h_{\hat{s}}^i$ and $h_{\hat{s}}^*$, the feature vector for the best hypothesis in terms of BLEU+1 to reference $\hat{t}$.

The goal of this process is to allow the machine translation system 100 to find a vector w such that $R_{\hat{s}} \cdot w \propto I_{\hat{s}}$, where $I_{\hat{s}}$ is a column vector of n rows containing the difference in BLEU+1 scores for each $h_{\hat{s}}^i$ from $h_{\hat{s}}^*$. This may be expressed by the equation $$w = \underset{w}{\operatorname{argmin}} \|R_{\hat{s}} \cdot w - I_{\hat{s}}\|^2,$$

which is a regression problem with an exact solution $w=(R'_{\hat{s}} \cdot R_{\hat{s}} + \beta I)^{-1} R'_{\hat{s}} \cdot I$, where $\beta=0.01$ is the regularization parameter that stabilizes $R'_{\hat{s}} \cdot R_{\hat{s}}$.

The solution $w^t$ for sentence pair $(\hat{s},\hat{t})^t$ at update time t is interpolated with the previous weight vector $w^{t-1}$ and used for re-translating of sentence $s^{t+1}$ in the next iteration (e.g., remaining sentence pairs that have yet to be post-edited by the client 105A. In accordance with the present technology, the machine translation system 100 is configured to initially generate a set of machine translation pairs. After receiving a post edit of one of these machine translation pairs in the set, the machine translation system 100 executes the adaptation and tuning methods described herein to update the translation model/methodologies used by the machine translation system 100. Once updated, the machine translation system 100 retranslates any remaining machine translations that have yet to be translated from the set. Each time post-edits are received the machine translation system 100 updates and retranslates any remaining machine translations. Thus, the machine translation system 100 may, for each post-edit received, iteratively update the translation model and retranslate any previous machine translations, assuming the machine translations have not been post-edited by a human translator.

In some instances the interpolation weight is set to 0.5. This allows the machine translation system 100 to utilize a combination between the generic weights 115C of the generic MT engine 115 and the IDW 100C. The machine translation system 100 uses the interpolation weight of 0.5 and multiplies both the generic weights 115C and the IDW 100C by 0.5. The machine translation system 100 then utilizes an average of these values. The use of interpolation ensures moderation of large discrepancies between the generic weights 115C and the IDW 100C, which may lead to poor translations for the client.

Figure 4:
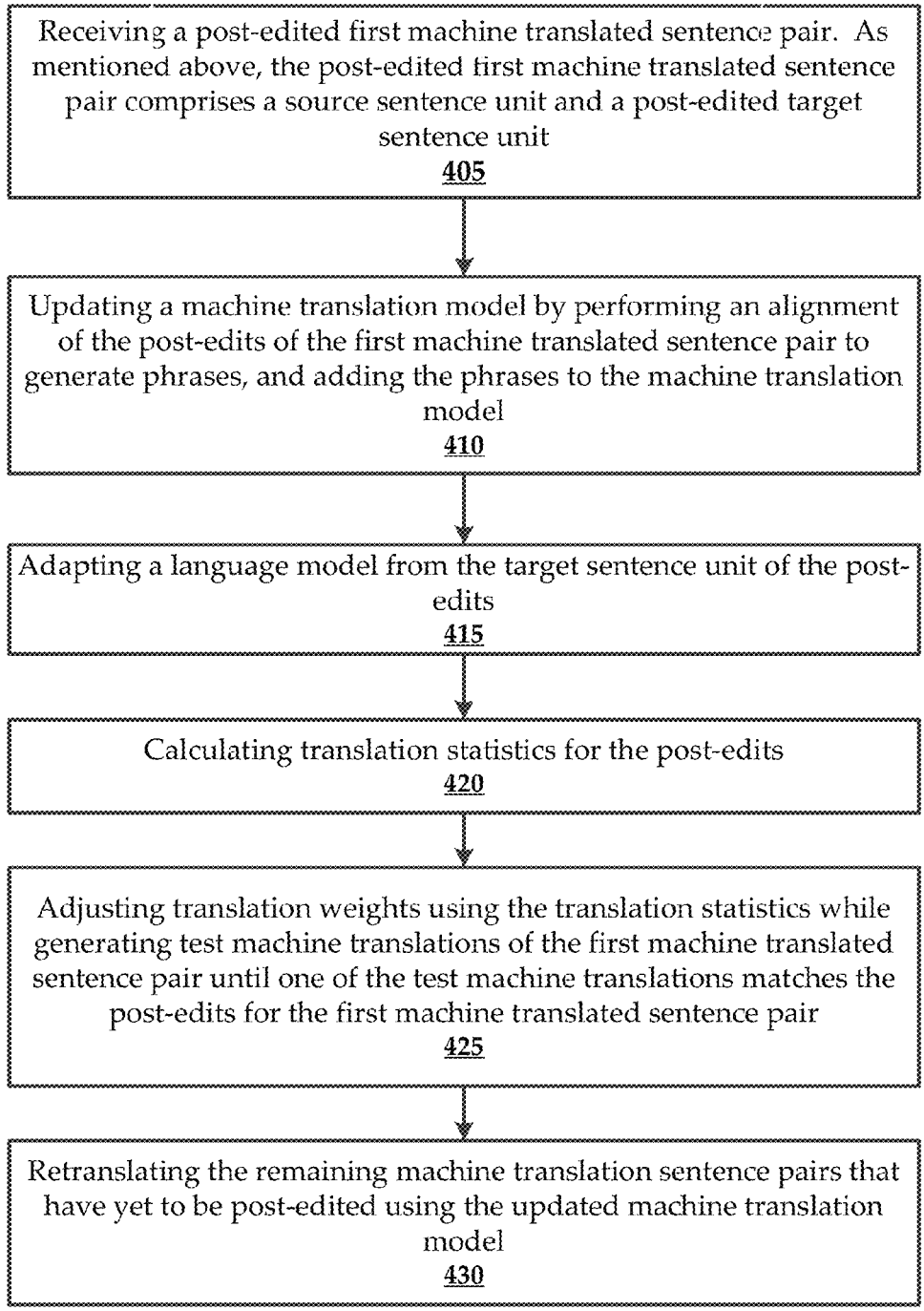
FIG. 4 is a flowchart of a method for immediately updating a machine translation system with post-edits during translation of a document

FIG. 4 is a flowchart of an exemplary method for immediately updating a machine translation system with post-edits during translation of a document. The method is executed by a machine translation system 100, which is configured to execute the method. In some instances, the method includes receiving 405 a post-edited machine translated sentence pair. As mentioned above, the post-edited machine translated sentence pair comprises a source sentence unit and a post-edited target sentence unit. Again, this post-edited machine translated sentence pair includes a machine translation sentence pair that has been post-edited by a human translator in order to alter or modify the target sentence unit that was generated by a generic MT engine.

Next, the method includes updating 410 a machine translation model by performing an alignment of the post-edits of the machine translated sentence pair to generate phrases, and adding the phrases to the machine translation model.

In some embodiments, the method includes adapting 415 a language model from the target sentence unit of the post-edits, as well as calculating 420 translation statistics for the post-edits.

Next, the method includes adjusting 425 translation weights using the translation statistics while generating test machine translations of the machine translated sentence pair until one of the test machine translations approximately matches the post-edits for the machine translated sentence pair. Finally, the method includes retranslating 430 the remaining machine translation sentence pairs that have yet to be post-edited using the updated machine translation model. In some embodiments, retranslated machine translation sentence pair may be post-edited by a human translator. Thus, the method may return to step 405 when a poste-edit to a retranslated machine translation sentence pair, which would result in incremental retranslation of the machine translation sentence pairs, even those pairs that have been retranslated one or more times. Advantageously, each time remaining sentence pairs are retranslated it is assumed that the retranslations will cause the sentence pairs to require a lesser amount of post-editing, or no post-editing at all.

Figure 5:
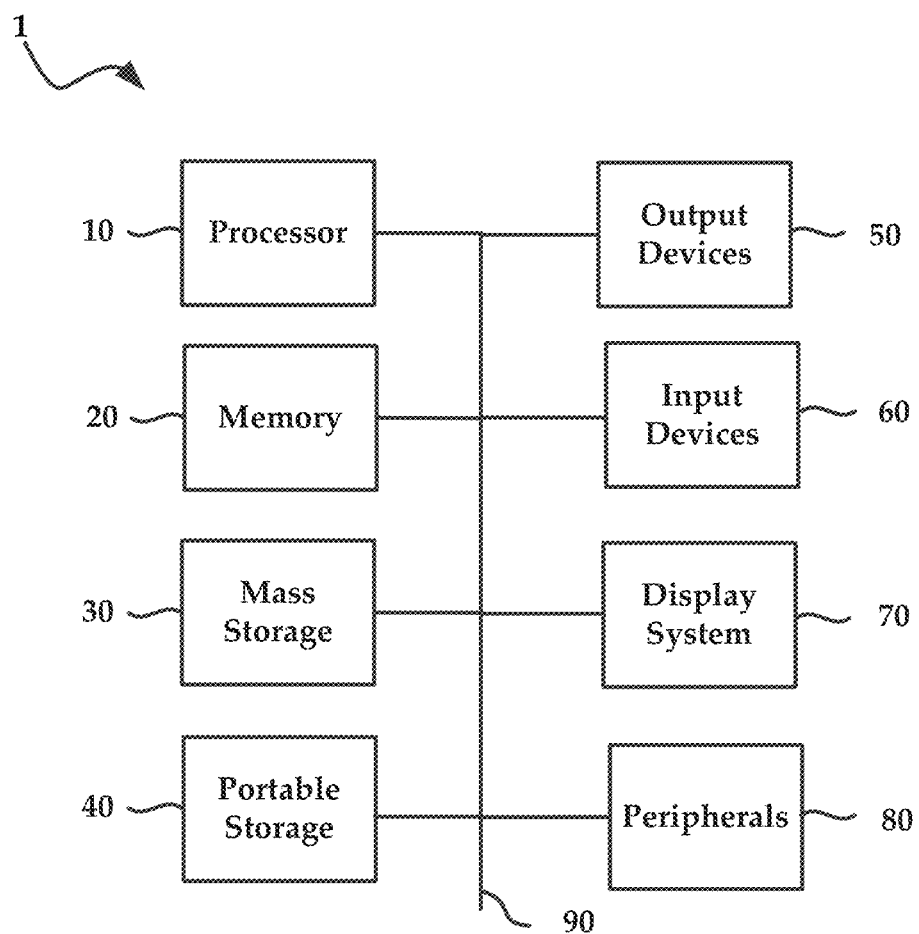
FIG. 5 illustrates an exemplary computing system that may be used to implement embodiments according to the present technology.

FIG. 5 illustrates an exemplary computing device (also referred to as computing system or system) 1 that may be used to implement an embodiment of the present systems and methods. The system 1 of FIG. 5 may be implemented in the contexts of the likes of computing devices, radios, terminals, networks, servers, or combinations thereof. The computing device 1 of FIG. 5 includes a processor 10 and main memory 20. Main memory 20 stores, in part, instructions and data for execution by processor 10. Main memory 20 may store the executable code when in operation. The system 1 of FIG. 5 further includes a mass storage device 30, portable storage device 40, output devices 50, user input devices 60, a display system 70, and peripherals 80.

The components shown in FIG. 5 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 5. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 5 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 5 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Chrome OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of immediately updating a machine translation system with post-edits during translation of a document, using a machine translation system that comprises a processor and a memory for storing logic that is executed by the processor to perform the method, comprising:
   receiving a post-edited machine translated sentence pair, the post-edited machine translated sentence pair comprising a source sentence unit and a post-edited target sentence unit;
   updating a machine translation model by:
      performing an alignment of the post-edits of the machine translated sentence pair to generate phrases; and
      adding the phrases to the machine translation model;
   adapting a language model from the post-edited target sentence unit;
   calculating translation statistics for the post-edits;
   adjusting translation weights using the translation statistics while generating test machine translations of the machine translated sentence pair until one of the test machine translations approximately matches the post-edits for the machine translated sentence pair; and
   retranslating remaining machine translation sentence pairs that have yet to be post-edited using the updated machine translation model and the adjusted translation weights.

2. The method according to claim 1, further comprising:
   receiving a document for translation from a source language into a target language; and
   performing a machine translation of the document to generate a set of machine translated sentence pairs.

3. The method according to claim 1, wherein the updating of the machine translation model further comprises tokenizing the post-edits of the machine translated sentence pair.

4. The method according to claim 3, wherein the updating of the machine translation model further comprises updating a vocabulary of source sentence units with unknown source sentence units included in the post-edits of the machine translated sentence pair and updating a vocabulary of target sentence units with unknown target sentence units included in the post-edits of the machine translated sentence pair.

5. The method according to claim 4, further comprising extracting fractional counts from the post-edits of the machine translated sentence pair and adding the extracted fractional counts to a fractional count table.

6. The method according to claim 5, further comprising adjusting probability distributions for the source sentence unit of the post-edits of the machine translated sentence pair.

7. The method according to claim 1, further comprising updating a phrase table with counts that define a number of occurrences of phrases in the phrase table; and reordering feature values for the phrases in the phrase table based upon the counts.

8. The method according to claim 1, wherein the translation weights for the machine translation system are adjusted using discriminative ridge regression.

9. The method according to claim 1, wherein the adapting of the language model includes executing an ngram-count of the post-edited machine translated sentence pair to update a count file that comprises counts for input sentence pairs; and recompiling the language model using a smoothing algorithm.

10. The method according to claim 1, wherein the alignment includes both forward and reverse alignments of the post-edited machine translated sentence pair.

11. A machine translation system that immediately incorporates post-edits into a machine translation model during translation of a document, the machine translation system comprising:
   a processor; and
   a memory for storing logic that is executed by the processor to:
      receive a post-edit of a target sentence unit of a machine translated sentence pair of a set of machine translated sentence pairs, wherein a machine translated sentence pair comprises a source sentence unit and the target sentence unit;

receive a post-edited machine translated sentence pair, the post-edited machine translated sentence pair comprising a post-edited source sentence unit and a post-edited target sentence unit;

update the machine translation model by:
  performing an alignment of the post-edits of the machine translated sentence pair to generate phrases; and
  adding the phrases to the machine translation model;

adapt a language model from the post-edited target sentence unit;

calculate translation statistics for the post-edits;

adjust translation weights using the translation statistics while generating test machine translations of the machine translated sentence pair until one of the test machine translations approximately matches the post-edits for the machine translated sentence pair; and retranslate remaining machine translation sentence pairs that have yet to be post-edited using the updated machine translation model.

12. The machine translation system according to claim 11, wherein the processor further executes the logic to:
  receive the document for translation from a source language into a target language; and
  perform a machine translation of the document to generate the set of machine translated sentence pairs.

13. The machine translation system according to claim 11, wherein the machine translation system updates the machine translation model by further tokenizing the post-edits of the machine translated sentence pair.

14. The machine translation system according to claim 13, wherein the machine translation system updates the machine translation model by updating a vocabulary of source sentence units with unknown source sentence units included in the post-edits of the machine translated sentence pair and updating a vocabulary of target sentence units with unknown target sentence units included in the post-edits of the machine translated sentence pair.

15. The machine translation system according to claim 14, wherein the processor further executes the logic to extract fractional counts from the post-edits of the machine translated sentence pair and adding the extracted fractional counts to a fractional count table.

16. The machine translation system according to claim 15, wherein the processor further executes the logic to adjust probability distributions for the source sentence unit of the post-edits of the machine translated sentence pair.

17. The machine translation system according to claim 11, wherein the processor further executes the logic to update a phrase table with counts that define a number of occurrences of phrases in the phrase table; and reorder feature values for the phrases in the phrase table based upon the counts.

18. The machine translation system according to claim 11, wherein the translation weights for the machine translation system are adjusted using discriminative ridge regression.

19. The machine translation system according to claim 11, wherein the machine translation system is configured to adapt the language model by executing an ngram-count of the post-edited machine translated sentence pair to update a count file that comprises counts for input sentence pairs; and recompiling the language model using a smoothing algorithm.

20. The machine translation system according to claim 11, wherein the machine translation system is configured to:
  receive post-edits for a retranslated machine translation sentence pair;
  re-updat the machine translation model;
  calculate translation statistics for the post-edits of the retranslated machine translation sentence pair;
  adjust translation weights using the translation statistics while generating test machine translations of the retranslated machine translated sentence pair until one of the test machine translations approximately matches the post-edits for the retranslated machine translation sentence pair; and
  retranslate any remaining retranslated machine translation sentence pairs that have yet to be post-edited using the updated machine translation model and the translation weights.

* * * * *